(12) United States Patent
Kausch et al.

(10) Patent No.: US 6,610,356 B2
(45) Date of Patent: Aug. 26, 2003

(54) DICHROIC POLARIZING FILM AND OPTICAL POLARIZER CONTAINING THE FILM

(75) Inventors: William L. Kausch, Cottage Grove, MN (US); Brian H. Williams, White Bear Lake, MN (US); William W. Merrill, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/974,225

(22) Filed: Oct. 9, 2001

(65) Prior Publication Data

US 2002/0017736 A1 Feb. 14, 2002

Related U.S. Application Data

(63) Continuation of application No. 09/604,491, filed on Jun. 27, 2000, now Pat. No. 6,335,051, which is a continuation of application No. 09/006,458, filed on Jan. 13, 1998, now Pat. No. 6,113,811.

(51) Int. Cl.$^7$ ............................. G02B 1/08; G02B 5/30; F21V 9/14
(52) U.S. Cl. .................. 427/163.1; 428/1.31; 428/910; 528/502; 252/585; 359/584
(58) Field of Search ................. 427/163.1; 428/1.31, 428/910; 252/585; 359/584; 528/502

(56) References Cited

U.S. PATENT DOCUMENTS

| | | | |
|---|---|---|---|
| ,540,768 A | 6/1895 | Western | |
| 2,444,712 A | 7/1948 | Signaigo | 88/65 |
| 3,124,639 A | 3/1964 | Kahn | 88/65 |
| 3,610,729 A | 10/1971 | Rogers | 350/157 |
| 3,711,176 A | 1/1973 | Alfrey, Jr. et al. | 350/1 |
| 3,860,036 A | 1/1975 | Newman, Jr. | 138/45 |
| 4,304,901 A | 12/1981 | O'Neill et al. | 528/290 |
| 4,388,375 A * | 6/1983 | Hopper et al. | |
| 4,440,541 A | 4/1984 | Berke | 8/489 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,544,693 A | 10/1985 | Surgant | 524/375 |
| 4,659,523 A | 4/1987 | Rogers et al. | 264/1.3 |
| 4,659,563 A | 4/1987 | Dobkin | 424/86 |
| 4,720,426 A | 1/1988 | Englert et al. | 428/344 |
| 4,756,953 A | 7/1988 | Utsumi | 428/220 |
| 4,802,745 A | 2/1989 | Okada et al. | 350/397 |
| 4,890,365 A | 1/1990 | Langer | 26/73 |
| 5,082,601 A * | 1/1992 | Okada et al. | |
| 5,122,557 A | 6/1992 | Claussen et al. | 524/162 |
| 5,188,760 A | 2/1993 | Hikmet et al. | 252/299.01 |
| 5,211,878 A | 5/1993 | Reiffenrath et al. | 252/299.63 |
| 5,213,582 A | 5/1993 | Wild et al. | 8/506 |
| 5,235,443 A | 8/1993 | Barnik et al. | 359/37 |
| 5,269,995 A | 12/1993 | Ramanathan et al. | 264/171 |
| 5,286,420 A * | 2/1994 | Claussen et al. | |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,340,504 A | 8/1994 | Claussen | 252/585 |
| 5,389,324 A | 2/1995 | Lewis et al. | 264/171 |
| 5,427,835 A | 6/1995 | Morrison et al. | 428/96 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,882,774 A | 3/1999 | Jonza et al. | 428/212 |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |
| 5,976,424 A | 11/1999 | Weber et al. | 264/1.6 |
| 6,088,067 A | 7/2000 | Willett et al. | 349/5 |
| 6,113,811 A | 9/2000 | Kausch et al. | 252/585 |
| 6,288,176 B1 | 9/2001 | Goetz et al. | 525/200 |
| 6,335,051 B1 | 1/2002 | Kausch et al. | 427/163.1 |

FOREIGN PATENT DOCUMENTS

| | | |
|---|---|---|
| DE | 44 06 426 | 8/1995 |
| EP | 0 297 927 | 4/1989 |

(List continued on next page.)

OTHER PUBLICATIONS

Schrenk et al., Nanolayer polymeric optical films, Tappi Journal, pp. 169–174, Jun., 1992.
Weber et al., "Giant Birefringent Optics in Multilayer Polymer Mirrors", Science, vol. 287, Mar. 31, 2000, pp. 2451–2456.

Primary Examiner—Tae H. Yoon
(74) Attorney, Agent, or Firm—Bruce E. Black

(57) ABSTRACT

A dichroic polarizing film is made, for example, by, first combining polyvinyl alcohol and a second polymer, such as, polyvinyl pyrrolidone or a sulfonated polyester, in a solvent. The ratio of polyvinyl alcohol to second polymer is between about 5:1 to 100:1 by weight. The film is coated on a substrate, dried, and then stretched to orient at least a portion of the film. The film incorporates a dichroic dye material, such as iodine, to form a dichroic polarizer. This polarizer may be used in conjunction with a multilayer optical film, such as a reflective polarizer, to form an optical polarizer. The multilayer optical film may contain two or more sets of polyester films, where at least one of the sets is birefringent and orientable by stretching. The polyvinyl alcohol/second polymer film and the multilayer optical film may be simultaneously stretched to orient both polymer films.

23 Claims, 1 Drawing Sheet

FOREIGN PATENT DOCUMENTS

| | | |
|---|---|---|
| EP | 0 564 925 | 8/1993 |
| GB | 1084820 | 9/1964 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO96/19347 | 6/1996 |
| WO | WO 97/01440 | 1/1997 |
| WO | WO 97/01726 | 1/1997 |
| WO | WO 97/01774 | 1/1997 |
| WO | WO97/01788 | 1/1997 |
| WO | WO 97/32223 | 4/1997 |
| WO | WO97/32226 | 9/1997 |
| WO | WO 99/36248 | 7/1999 |
| WO | WO 99/36262 | 7/1999 |

\* cited by examiner

DICHROIC POLARIZING FILM AND OPTICAL POLARIZER CONTAINING THE FILM

This is a continuation of application Ser. No. 09/604,491 filed Jun. 27, 2000 now U.S. Pat. No. 6,335,051 which is a continuation of application Ser. No. 09/006,458 filed Jan. 13, 1998, now U.S. Pat. No. 6,113,811

FIELD OF THE INVENTION

The present invention relates to a polarizing film and an optical polarizer containing the film. More particularly, the invention relates to a dichroic polarizing film made from a dispersion or solution of a polyvinyl alcohol and a second polymer, and an optical polarizer containing the film.

BACKGROUND OF THE INVENTION

Optical polarizing film is widely used for glare reduction and for increasing optical contrast in such products as sunglasses and Liquid Crystal Displays (LCD). One of the most commonly used types of polarizers for these applications is a dichroic polarizer which absorbs light of one polarization and transmits light of the other polarization. One type of dichroic polarizer is made by incorporating a dye into a polymer matrix which is stretched in at least one direction. Dichroic polarizers may also be made by uniaxially stretching a polymer matrix and staining the matrix with a dichroic dye. Alternatively, a polymer matrix may be stained with an oriented dichroic dye. Dichroic dyes include anthraquinone and azo dyes, as well as iodine. Many commercial dichroic polarizers use polyvinyl alcohol as the polymer matrix for the dye.

Another type of polarizer is a reflective polarizer which reflects light of one polarization and transmits light of another orthogonal polarization. One type of reflective polarizer is made by forming a stack of alternating sets of polymer layers, one of the sets being birefringent to form reflective interfaces in the stack. Typically, the indices of refraction of the layers in the two sets are approximately equal in one direction so that light polarized in a plane parallel to that direction is transmitted. The indices of refraction are typically different in a second, orthogonal direction so that light polarized in a plane parallel to the orthogonal direction is reflected.

One measure of performance for polarizers is the extinction ratio. The extinction ratio is the ratio of a) light transmitted by the polarizer in a preferentially transmitted polarization state to b) light transmitted in an orthogonal polarization state. These two orthogonal states are often related to the two linear polarizations of light. However, other types of orthogonal states, such as, left and right-handed circular polarizations or two orthogonal elliptical polarizations may also be used. The extinction ratios of dichroic polarizers vary over a wide range depending on their specific construction and target application. For example, dichroic polarizers may have extinction ratios between 5:1 and 3000:1. Dichroic polarizers used in display systems typically have extinction ratios which are preferably greater than 100:1 and even more preferably greater than 500:1.

Dichroic polarizers typically absorb light in the non-transmission polarization. However, dichroic polarizers also absorb some of the light having the high transmission polarization. The amount of this absorption depends on the details of the construction of the polarizer and the designed extinction ratio. For high performance display polarizers, such as those used in LCDs, this absorption loss is typically between about 5 and 15%. The reflectivity of these polarizers for light having the absorption (i.e., low transmission) polarization tends to be small. Even with surface reflections included, this reflectivity is typically less than 10% and usually less than 5%.

Reflective polarizers typically reflect light having one polarization and transmit light having an orthogonal polarization. Reflective polarizers often have incomplete reflectivity of the high extinction polarization over a wavelength region of interest. Typically, the reflectivity is greater than 50% and is often greater than 90% or 95%. A reflective polarizer will also typically have some absorption of light having the high transmission polarization. Typically, this absorption is less than about 5 to 15%.

The above two types of polarizers may be combined to make a single optical polarizer, thereby incorporating the useful characteristics of both types of polarizers. These polarizers may be formed and, optionally, oriented together. Unfortunately, the polyvinyl alcohol film used in many dichroic polarizers tends to crack under the processing conditions necessary to prepare some reflective polarizers, including, for example, those which use polyethylene naphthalate (PEN) or coPEN optical layers. These reflective polarizers may be formed by stretching a polymeric film at processing temperatures, such as 135 to 180° C., and a stretch ratio of between 2:1 and 10:1. There is a need for a dichroic film layer that does not crack under these processing conditions.

Dichroic polarizers may also be used with other optical devices, such as other types of reflective polarizers and mirrors. The combination of a dichroic polarizer with an IR mirror may be useful for reducing glare. The formation of the dichroic polarizer in combination with the mirror retains the processing difficulties mentioned above, especially when the mirror is made using oriented polyester layers.

SUMMARY OF THE INVENTION

Accordingly, the present invention relates to dichroic polarizing films and their use in optical polarizers. In one embodiment, a polarizing film includes a polymeric film which contains polyvinyl alcohol and a second polymer. The polymeric film is oriented and incorporates a dichroic dye material. The dichroic dye material may be incorporated before or after stretching of the film.

Another embodiment is an optical device which includes a substrate and a polarizing film. The polarizing film is disposed on the substrate and contains polyvinyl alcohol and a second polymer. The polymeric film is oriented and incorporates a dichroic dye material.

A further embodiment is a method of making an optical device. The method includes forming a dispersion of polyvinyl alcohol and a second polymer in a solvent. A substrate is coated with the dispersion/solution and then the solvent is removed from the dispersion to form a polymeric film. The polymeric film is then oriented by stretching in at least one direction. A dichroic dye material is also incorporated in the polymeric film.

Another embodiment is a display device made from a polarizing film. The polarizing film includes a polymeric film which contains polyvinyl alcohol and a second polymer. The polymeric film is oriented and incorporates a dichroic dye material.

The above summary of the invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
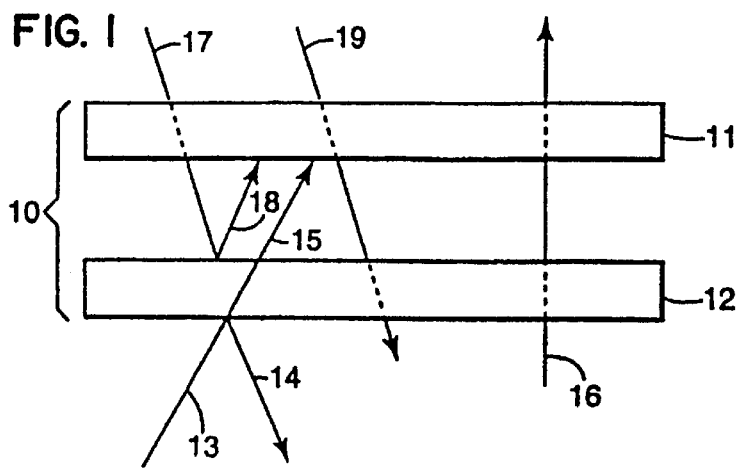
FIG. 1 is a side elevational view of one embodiment of an optical polarizer according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention is directed to optical polarizers and in particular to dichroic polarizers. The invention is also directed to the formation of these polarizers and to their use with other optical elements, such as reflective polarizers, mirrors, and IR mirrors., Some conventional dichroic polarizers 11 are made using polyvinyl alcohol films. These films are well-known in the art and have been used, upon incorporation of a dye material, as dichroic polarizers. To function as a diebroic polarizer, the polyvinyl alcohol film is typically stretched to orient the film. When stained, the orientation of the film determines the optical properties (e.g., the axis of extinction) of the film. One use of these films is in conjunction with multilayer optical films which are also stretched to orient one or more layers of the film to form, for example, reflective polarizers and mirrors. Examples of such multilayer optical films may be found in U.S. patent application Ser. Nos. 08/402,041, 09/006,601, 09/006,288, and 09/006,455, all of which are incorporated herein by reference. Other multilayer optical films, reflective polarizers, mirrors, and optical devices may also be used in conjunction with the dichroic polarizers.

Unfortunately, polyvinyl alcohol films tend to crack under the stretching conditions used in the formation of many reflective polarizers, including, for example, those made from multilayer polyester films, and in particular, polyester films containing naphthalate subunits such as PEN. Although no particular theory is necessary to the invention, it is thought that polyvinyl alcohol forms a hydrogen-bonded network which is incapable of stretching under these conditions while maintaining its structural integrity. The hydrogen-bonded network is strained and, finally, at one or more points slips, thereby causing cracks. Experimentation indicates that small molecule plasticizers do not solve this problem.

It has been found that the addition of a second polymer dispersible or soluble in a solvent used in the formation of the polyvinyl alcohol film significantly reduces cracking. The second polymer is included as either a dispersion or a solution, depending on the nature of the second polymer, and the terms "dispersion" and "solution" will be used interchangeably herein. The second polymer is preferably water-soluble as water is a common solvent for polyvinyl alcohol. More preferably, the second polymer is a polar polymer. Suitable second polymers include, for example, polyvinyl pyrrolidone and polyesters dispersible in the solvent of the polyvinyl alcohol. Examples of water-soluble or water dispersible polyesters include sulfonated polyesters, such as those describe in U.S. Pat. No. 5,427,835, incorporated herein by reference. Suitable co-solvents include, for example, polar solvents such as C1–C4 alcohols.

Typically, the polyvinyl alcohol and second polymer are mixed in a ratio of between 5:1 and 100:1 by weight, and preferably between 8:1 and 20:1 by weight. The solution is typically 1 to 50 wt. % solids, and preferably 5 to 25 wt. % solids. Although no particular theory is necessary to the invention, it is thought that the addition of the second polymer separates the hydrogen-bonded network into a large number of domains which may move relative to each other when strained, thereby relieving the strain and reducing the amount of cracking.

The polyvinyl alcohol film may be made by a variety of techniques. One exemplary method for making the film includes combining the polyvinyl alcohol and the second polymer in a solvent according to the above-mentioned ratios and weight percentages. This dispersion/solution of the two polymers is then applied to the surface of a substrate. The substrate may be another film, a multilayer stack, a plastic object, or any other surface which allows stretching of the polyvinyl alcohol film. Application of the dispersion/ solution may be accomplished by a variety of known methods, including, for example, coating the substrate using techniques, such as shoe coating, extrusion coating, roll coating, curtain coating, or any other coating method capable of providing a uniform coating. The substrate may be coated with a primer or treated with a corona discharge to help anchor the polyvinyl alcohol film to the substrate. Typically, the thickness of the coating is 25 to 500 $\mu$m when wet and preferably 50 to 125 $\mu$m. After coating, the polyvinyl alcohol film is dried at a temperature typically between 100° C. and 150° C. The film is then stretched using, for example, length orienters or tenter clips to orient the film. In some embodiments, the film is removed from the substrate. The film may then be adhered to another surface, if desired. The polyvinyl alcohol film, when stained, can then be used as a dichroic polarizer. However, it will be understood that other uses may be made of the polyvinyl alcohol film.

A finished polyvinyl alcohol film typically includes a dichroic dye material to form a dichroic polarizer. The dichroic dye material may include dyes, pigments, and the like. Suitable dye materials for use in the dichroic polarizer film include, for example, iodine, as well as anthraquinone and azo dyes, such as Congo Red (sodium diphenyl-bis-$\alpha$-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). Still other dichroic dyes, and methods of making them, are discussed in the Kirk Othmer Encyclopedia of Chemical Technology, Vol. 8, pp. 652–661 (4th Ed. 1993), and in the references cited therein.

The dichroic dye material may be added to the dispersion or solution of the polyvinyl alcohol and second polymer prior to coating. Alternatively, a polyvinyl alcohol film may be stained with a staining composition, such as, for example, an iodine-containing solution. The staining of the polyvinyl alcohol film may occur before or after the film is drawn. In some cases, the dichroic dye material may not be able to withstand the drawing conditions and should therefore be applied to the polyvinyl alcohol film after drawing.

One example of a suitable staining composition is an iodine-containing solution. The iodine stained film may be stabilized using, for example, a boroncontaining composition, such as a boric acid/borax solution. Other stains may require different stabilizers. The concentrations of the staining or stabilizing compositions, as well as the temperature at which the staining or stabilization occurs and the time of contact with each solution, may vary widely without compromising the stain.

Various other components may be added to the dispersion/ solution of polyvinyl alcohol and the second polymer. For example, a surfactant may be added to facilitate wetting of the substrate. A wide variety of surfactants may be used, including, for example, Triton X-100 (Union Carbide Chemicals and Plastics Company, Inc., Danbury, Conn.). The surfactant is typically about 1% or less of the solution, and preferably about 0.5% or less. The surfactant is preferably nonionic so that it does not interfere with polar groups on the polymer.

Another optional additive is a drying aid which facilitates film formation on drying. Example of a suitable drying aids includes N-methyl-pyrrolidone and butyl carbitol. The drying aid is typically about 10% or less of the solution, and preferably about 5% or less.

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, compensation films, retardation films, diffuse adhesives, and/or substrates designed to improve the mechanical integrity or strength of the film or device. In addition, an adhesive may be applied to the polyvinyl alcohol film to adhere the film to the substrate. This may be particularly useful when the polyvinyl alcohol film is removed from a first substrate and then placed on a second substrate. A variety of adhesives may be used including, for example, resins and pressure sensitive adhesives (PSA). When choosing a suitable adhesive, the optical properties of the adhesive are usually considered. The addition of a second polymer to the polyvinyl alcohol film provides an improved dichroic polarizer which is compatible with the simultaneous orientation of the polyvinyl alcohol film and a multilayer optical film, such as a reflective polarizer or mirror film. The advantage of using the improved dichroic polarizer is that the dichroic and multilayer optical film may be oriented together, thereby forming, for example, an optical polarizer which may have dichroic and reflective elements that are more perfectly aligned. Furthermore, the addition of a second polymer to the polyvinyl alcohol film often improves the adhesion of the film to a substrate.

An exemplary process for forming optical devices includes, first, forming a multilayer optical film, as described below. This multilayer optical film is coated or laminated with a polyvinyl alcohol film which incorporates the second polymer. This may be accomplished using well-known devices, such as, for example, shoe coating, extrusion coating, roll coating, curtain coating, or any other coating method capable of providing a uniform coating.

The multilayer optical film and the polyvinyl alcohol film are then simultaneously drawn to form an oriented multilayer optical film and an oriented polyvinyl alcohol film. In some embodiments, the multilayer optical film is drawn multiple times. In these embodiments, the polyvinyl alcohol film is often coated or laminated on the multilayer optical film prior to the final draw. In alternative embodiments, the two films may be drawn and oriented separately. Known devices may be used to draw the two films, including, for example, tenters or long orienters. Drawing the polyvinyl alcohol film and the multilayer optical film together typically results in the orientation axis of the polyvinyl alcohol layer being coincident with the axis of final orientation of the multilayer optical film, which may be either a polarizer film or a mirror film. Dichroic dye material may be added prior to drawing the films, or may be incorporated later by, for example, staining the polyvinyl alcohol film, as described above.

A number of different combinations of dichroic polarizer and multilayer polymer films may be formed. For example, a visible band dichroic and reflective polarizer combination, an IR band mirror and dichroic polarizer combination, an IR band polarizer and dichroic polarizer combination, among others, may be formed.

FIG. 1 illustrates an exemplary device, namely an optical polarizer 10 which includes a dichroic polarizer 11 and a reflective polarizer 12. This combination of two different types of polarizers may create an optical polarizer with a high reflection/absorption of light of one polarization and a high transmission of light with a second, orthogonal polarization. Typically, the two polarizers are aligned with respect to each other to provide maximum transmissivity of light having a particular polarization.

The dichroic polarizer 11 is typically in close proximity to the reflective polarizer 12, although this is not necessary. Preferably, the two polarizers 11, 12 are bonded to each other to eliminate any air gap.

The reflective polarizer 12 usually reflects a substantial portion of light having a first polarization and transmits most of the light having a second, orthogonal polarization. The dichroic polarizer 11 typically absorbs most of light having a third polarization and transmits a substantial portion of light having a fourth, orthogonal polarization. Often, the optical polarizer 10 is formed by orienting the reflective polarizer 12 and the dichroic polarizer 11 so that they transmit light of a particular polarization (i.e., the second and fourth polarization are the same) and reflect/absorb light of an orthogonal polarization (i.e., the first and third polarizations are the same). The present invention will be discussed with reference to this particular configuration. However, other configurations in which the reflective polarizer 12 and the dichroic polarizer 11 are oriented in a different manner with respect to each other are also possible and included within the invention.

In use, the combined polarizers are illuminated on one or both of the outside facing surfaces, as illustrated in FIG. 1. Ray 13 is light having a polarization that is preferentially reflected by the reflective polarizer 12 to form ray 14. Ray 15 is light from ray 13 that is transmitted by the reflective polarizer 12. Typically, ray 15 is much less intense than ray 14. In addition, ray 15 is usually attenuated by the dichroic polarizer 11. Light ray 16, which is orthogonally polarized to ray 13, is preferentially transmitted by the reflective polarizer 12 and is typically only slightly attenuated by the dichroic polarizer 11.

Ray 17 is light having a polarization that is preferentially absorbed by the dichroic polarizer 11, and which preferably has the same polarization as ray 13. The portion of ray 17 which is transmitted by the dichroic polarizer 11 is further attenuated by reflection off the reflective polarizer 12, thereby forming ray 18. Light ray 19 is polarized orthogonally to ray 17 and preferably has the same polarization as ray 16. Ray 19 is preferentially transmitted by both the dichroic polarizer 11 and the reflective polarizer 12.

Combining the dichroic polarizer 11 with the reflective polarizer 12 results in an optical polarizer 10 which has a higher extinction ratio of the transmitted light than would be the case with a dichroic polarizer by itself. This allows for the use of a dichroic polarizer with a lower extinction ratio. This may be useful, as dichroic polarizers typically absorb some of the light that is to be transmitted. Using a dichroic polarizer with a lower extinction ratio may increase the amount of light of the desired polarization which is transmitted. For light polarized along the extinction axis, the preferred extinction percentage for the dichroic polarizer is 10% or greater, more preferred is 55% or greater, and most preferred is 70% or greater. The best choice of dichroic and reflective polarizers depends on the design goals, including the allowed reflectivity from the dichroic polarizer side of the film, the extinction ratio of the reflective polarizer, and the desired final polarizer contrast.

The combination of the reflective polarizer with the dichroic polarizer has other advantages. For example, this combination has a high reflectivity from one side of the film for one polarization and a low reflectivity from the other side of the film. The combination of these two characteristics may be useful in a number of systems including direct view LCDs. For example, a direct view LCD might have a back side reflectivity of 1% and require a final extinction ratio greater than 1000:1. To achieve 1% reflectivity when combined with a reflective polarizer with an approximately 100% reflectivity, the dichroic polarizer would need to transmit 10% or less of light polarized in the extinction direction. If the reflective polarizer has an extinction ratio of 50:1 then the dichroic polarizer would typically require an extinction ratio of at least 20:1 to achieve the final extinction ratio of 1000:1.

The reflective polarizer 12 may contain internal structure, such as interfaces between different materials, where the index is not exactly matched in the appropriate directions, or other scattering centers. Both of these types of internal structure may interfere with light which would normally be transmitted through the polarizer. In general, it is preferred that the reflection of light having the transmission polarization by the reflective polarizer 12 be about 30% or less, more preferably about 20% or less, and most preferably about 15% or less. In addition, the reflectivity of the reflective polarizer depends on the wavelength range and the angle of incident light. The preferred reflection percentage by the reflective polarizer 12 for light having the reflection polarization and within a wavelength range of interest is 20% or greater, more preferably 50% or greater and most preferably 90% or greater.

Similar design features and parameters may be used when the multilayer optical film is a mirror or IR mirror. The preferred reflection percentage by a mirror for light with a wavelength range of interest, whether visible or infrared, is 20% or greater, more preferably about 50% or greater, and most preferably about 90% or greater.

Figure 2:
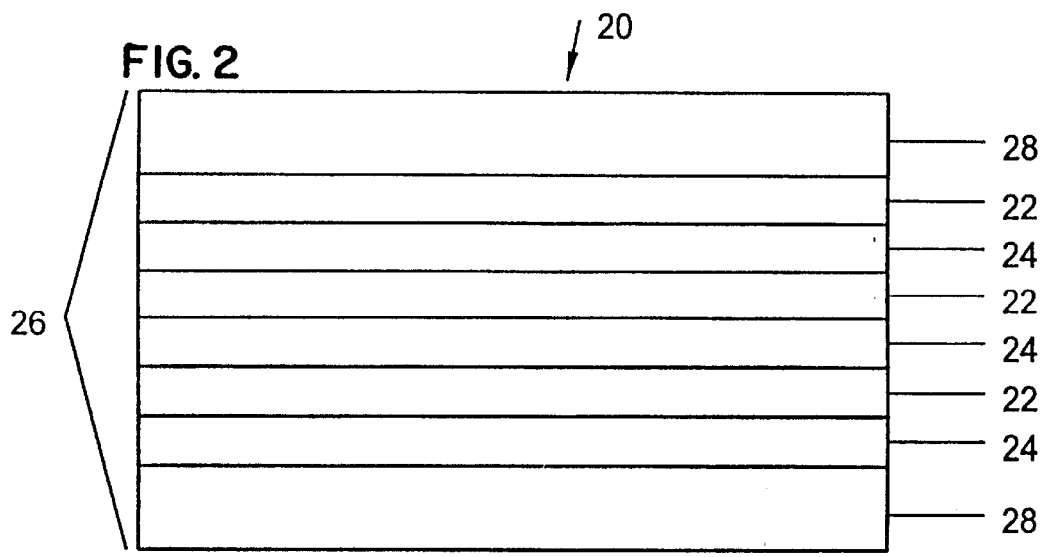
FIG. 2 is a side elevational view of one embodiment of a multilayer optical film for use in the optical polarizer of FIG. 1.

One example of a useful multilayer optical film 20 is shown in FIG. 2. This multilayer optical film 20 may be used to make reflective polarizers, mirrors and other optical devices. The multilayer optical film 20 includes one or more first optical layers 22, one or more second optical layers 24, and one or more non-optical layers 28. The first optical layers 22 are often birefringent polymer layers which are uniaxially- or biaxially-oriented. In some embodiments, the first optical layers 22 are not birefringent. The second optical layers 24 may be polymer layers which are birefringent and uniaxially- or biaxially-oriented. More typically, however, the second optical layers 24 have an isotropic index of refraction which is different than at least one of the indices of refraction of the first optical layers 22 after orientation. The methods of manufacture and use, as well as design considerations for the multilayer optical films 20 are described in detail in U.S. patent application Ser. Nos. 08/402,041, 09/006,601, and 09/006,288, all of which are herein incorporated by reference. Although, the present invention will be primarily exemplified by multilayer optical films 20 with second optical layers 24 which have an isotropic index of refraction, the principles and examples described herein may be applied to multilayer optical films 20 with second optical layers 24 that are birefringent, as described in, for example, U.S. patent application Ser. No. 09/006,455, which is also herein incorporated by reference.

Additional sets of optical layers, similar to the first and second optical layers 22, 24, may also be used in the multilayer optical film 20. The design principles disclosed herein for the sets of first and second optical layers may be applied to any additional sets of optical layers. Furthermore, it will be appreciated that, although only a single stack 26 is illustrated in FIG. 2, the multilayer optical film 20 may be made from multiple stacks that are subsequently combined to form the film 20.

The optical layers 22, 24 and, optionally, one or more of the non-optical layers 28 are typically placed one on top of the other to form a stack 26 of layers. Usually the optical layers 22, 24 are arranged as alternating pairs, as shown in FIG. 2, to form a series of interfaces between layers with different optical properties. The optical layers 22, 24 are typically less than 1 $\mu$m thick, although thicker layers may be used. Furthermore, although FIG. 2 shows only six optical layers 22, 24, many multilayer optical films 20 have a large number of optical layers. Typical multilayer optical films 20 have about 2 to 5000 optical layers, preferably about 25 to 2000 optical layers, more preferably about 50 to 1500 optical layers, and most preferably about 75 to 1000 optical layers.

The non-optical layers 28 are polymer films that are disposed within (see FIG. 3) and/or over (see FIG. 2) the stack 26 to protect the optical layers 22, 24 from damage, to aid in the co-extrusion processing, and/or to enhance post-processing mechanical properties. The non-optical layers 28 are often thicker than the optical layers 22, 24. The thickness of the non-optical layers 28 is usually at least two times, preferably at least four times, and more preferably at least ten times, the thickness of the individual optical layers 22, 24. The thickness of the non-optical layers 28 may be varied to obtain a particular thickness of the optical film 20. Typically, one or more of the non-optical layers 28 are placed so that at least a portion of the light to be transmitted, polarized, and/or reflected by the optical layers 22, 24, also travels through the non-optical layers (i.e., the non-optical layers are placed in the path of light which travels through or is reflected by the optical layers 22, 24).

As a non-limiting example, the optical layers 22, 24 and the non-optical layers 28 of the multilayer optical film 20 may be made using polymers, such as polyesters. The term "polymer" includes polymers and copolymers, as well as polymers and/or copolymers which may be formed in a miscible blend, for example, by coextrusion or by reactions, including, for example, transesterification. Polyesters have carboxylate and glycol subunits which are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules.

The properties of a polymer layer or film vary with the particular choice of monomer molecules. One example of a polyester useful in multilayer optical films is polyethylene naphthalate (PEN) which can be made, for example, by reactions of naphthalene dicarboxylic acid with ethylene glycol.

Suitable carboxylate monomer molecules for use in forming the carboxylate subunits of the polyester layers include, for example, 2,6-naphthalene dicarboxylic acid and isomers thereof; tereplithalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, tri-mellitic acid, sodium sulfonated isophthalic acid; 2,2'-biphenyl dicarboxylic acid and isomers thereof, and lower alkyl esters of these acids, such as methyl or ethyl esters. The term "lower alkyl" refers, in this context, to C1–C10 straight-chained or branched alkyl groups. Also included within the term "polyester" are polycarbonates which are derived from the reaction of glycol monomer molecules with esters of carbonic acid.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof, norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Non-polyester polymers are also useful in creating polarizer or mirror films. For example, layers made from a polyester such as polyethylene naphthalate may be combined with layers made from an acrylic polymer to form a highly reflective mirror film. In addition, polyether imides may also be used with polyesters, such as PEN and coPEN, to generate a multilayer optical film 20. Other polyester/non-polyester combinations, such as polybutylene terephthalate and polyvinyl chloride, may also be used.

Multilayered optical films may also be made using only non-polyesters. For example, poly(methyl methacrylate) and polyvinylidene fluoride may be used to make layers for a multilayer optical film 20. Another non-polyester combination is atactic or syndiotactic polystyrene and polyphenylene oxide. Other combinations may also be used.

The first optical layers 22 are typically orientable polymer films, such as polyester films, which may be made birefringent by, for example, stretching the first optical layers 22 in a desired direction or directions. The term "birefringent" means that the indices of refraction in orthogonal x, y, and z directions are not all the same. For films or layers in a film, a convenient choice of x, y, and z axes is shown in FIG. 2 in which the x and y axes correspond to the length and width of the film or layer and the z axis corresponds to the thickness of the layer or film. In the embodiment illustrated in FIG. 2, the multilayer optical film 20 has several optical layers 22, 24 which are stacked one on top of the other in the z-direction.

The first optical layers 22 may be uniaxially-oriented, for example, by stretching in a single direction. A second orthogonal direction may be allowed to neck into some value less than its original length. In one embodiment, the direction of stretching substantially corresponds to either the x or y axis shown in FIG. 2. However, other directions may be chosen. A birefringent, uniaxially-oriented layer typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction will depend on factors such as the amount of stretching, the stretch rate, the temperature of the film during stretching, the thickness of the film, the variation in film thickness, and the composition of the film. Typically, the first optical layers 22 have an in-plane birefringence (the absolute value of $n_x - n_y$) after orientation of 0.04 or greater at 632.8 nm, preferably about 0.1 or greater, and more preferably about 0.2 or greater. All birefringence and index of refraction values are reported for 632.8 nm light unless otherwise indicated.

Polyethylene naphthalate (PEN) is an example of a useful material for forming the first optical layers 22 because it is highly birefringent after stretching. The refractive index of PEN for 632.8 nm light polarized in a plane parallel to the stretch direction increases from about 1.62 to as high as about 1.87. Within the visible spectrum, PEN exhibits a birefringence of 0.20 to 0.40 over a wavelength range of 400–700 nm for a typical high orientation stretch (e.g., a material stretched to five or more times its original dimension at a temperature of 130° C. and an initial strain rate of 20%/min).

The birefringence of a material can be increased by increasing the molecular orientation. Many birefringent materials are crystalline or semicrystalline. The term "crystalline" will be used herein to refer to both crystalline and semicrystalline materials. PEN and other crystalline polyesters, such as polybutylene naphthalate (PBN), polyethylene terephthalate (PET) and polybutylene terephthalate (PDT), are examples of crystalline materials useful in the construction of birefringent film layers such as is often the case for the first optical layers 22. In addition, some copolymers of PEN, PBN, PET, and PBT are also crystalline or semicrystalline. The addition of a comonomer to PEN, PBN, PET, or PBT may enhance other properties of the material including, for example, adhesion to the second optical layers 24 or the non-optical layers 28 and/or the lowering of the working temperature (i.e., the temperature for extrusion and/or stretching the film).

If the polyester material of the first optical layers 22 contains more than one type of carboxylate subunit, then the polyester may be a block copolyester to enhance adhesion to other layers (e.g., the second optical layers 24 or non-optical layers 28) made from block copolymers having similar blocks. Random copolyesters may also be used.

Figure 3:
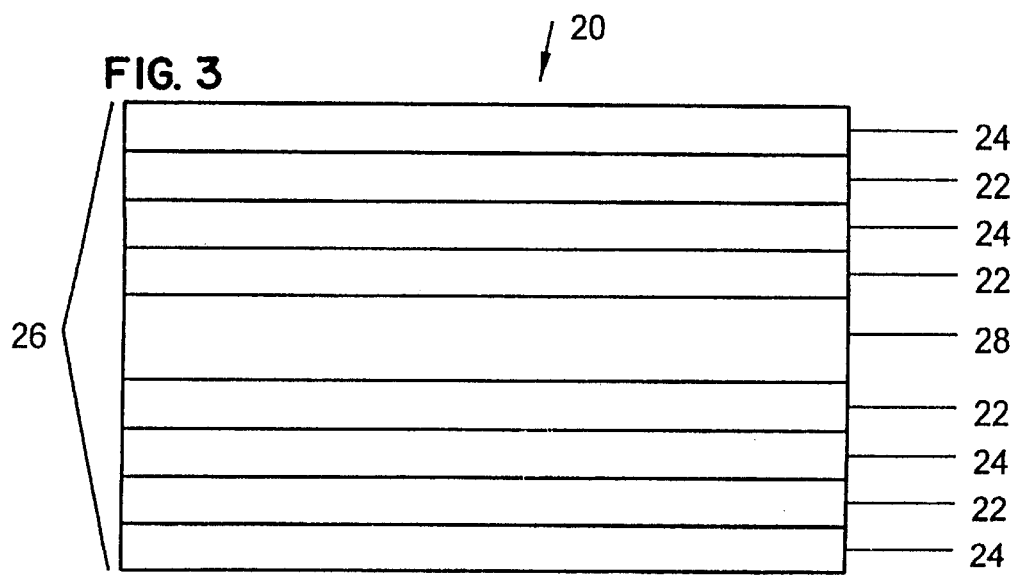
FIG. 3 is a side elevational view of another embodiment of a multilayer optical film for use in the optical polarizer of FIG. 1.

Referring again to FIGS. 2 and 3, one or more of the non-optical layers 28 may be formed as a skin layer over at least one surface of stack 26 as illustrated in FIG. 2, to, for example, protect the optical layers 22, 24 from physical damage during processing and/or afterwards. In addition, one or more of non-optical layers 28 may be formed within the stack 26 of layers, as illustrated in FIG. 3, to, for example, provide greater mechanical strength to the stack or to protect the stack during processing.

The non-optical layers 28 ideally do not significantly participate in the determination of optical properties of the multilayer optical film 20, at least across the wavelength region of interest. The non-optical layers 28 are typically not birefringent or orientable but in some cases this may not be true. Typically, when the non-optical layers 28 are used as skin layers there will be at least some surface reflection. If a multilayer optical film 20 is to be a reflective polarizer, the non-optical layers preferably have an index of refraction which is relatively low. This decreases the amount of surface reflection. If the multilayer optical film 20 is to be a mirror, the non-optical layers 28 preferably have an index of refraction which is high, to increase the reflection of light.

When the non-optical layers 28 are found within the stack 26, there will typically be at least some polarization or reflection of light by the non-optical layers 28 in combination with the optical layers 22, 24 adjacent to the non-optical layers 28. Typically, however, the non-optical layers 28 have a thickness which dictates that light reflected by the non-optical layers 28 within the stack 26 has a wavelength outside the region of interest, for example, in the infrared region for visible light polarizers or mirrors.

The non-optical layers 28 may also be made from copolyesters similar to the second optical layers 24, using similar materials and similar amounts of each material. In addition, other polymers may also be used, as described above with respect to the second optical layers 24. It has been found that the use of coPEN (i.e., a copolymer of PEN) or other copolymer material for skin layers (as seen in FIG. 2) reduces the splittiness (i.e., the breaking apart of a film due to strain-induced crystallinity and alignment of a majority of the polymer molecules in the direction of orientation) of the multilayer optical film 20, because the coPEN of the skin layers orients very little when stretched under the conditions used to orient the first optical layers 22.

Preferably, the polyesters of the first optical layers 22, the second optical layers 24, and the non-optical layers 28 are chosen to have similar rheological properties (e.g., melt viscosities) so that they can be co-extruded. Typically, the second optical layers 24 and the non-optical layers 28 have a glass transition temperature, $T_g$, that is either below or no greater than about 40° C. above the glass transition temperature of the first optical layers 22. Preferably, the glass transition temperature of the second optical layers 24 and the non-optical layers 28 is below the glass transition temperature of the first optical layers 22.

A reflective polarizer may be made by combining a uniaxially-oriented first optical layer 22 with a second optical layer 24 having an isotropic index of refraction that is approximately equal to one of the in-plane indices of the oriented layer. Alternatively, both optical layers 12,14 are formed from birefringent polymers and are oriented in a multiple draw process so that the indices of refraction in a single in-plane direction are approximately equal. The interface between the two optical layers 12,14, in either case, forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers 22, 24.

Typically, the highest reflectivity for a particular interface occurs at a wavelength corresponding to twice the combined optical thickness of the pair of optical layers 22, 24 which form the interface. The optical thickness of the two layers is $n_1 d_1 + n_2 d_2$ where $n_1$, $n_2$ are the indices of refraction of the two layers and $d_1$, $d_2$ the thicknesses of the layers. The layers 22, 24 may each be a quarter wavelength thick or the layers 22, 24 may have different optical thicknesses, so long as the sum of the optical thicknesses is half of a wavelength (or a multiple thereof). A film having a plurality of layers may include layers with different optical thicknesses to increase the reflectivity of the film over a range of wavelengths. For example, a film may include pairs of layers which are individually tuned to achieve optimal reflection of light having particular wavelengths.

Alternatively, the first optical layers 22 may be biaxially-oriented by stretching in two different directions. The stretching of optical layers 22 in the two directions may result in a net symmetrical or asymmetrical stretch in the two chosen orthogonal axes.

One example of the formation of a mirror using a multilayer optical film 20 is the combination of a biaxially-oriented optical layer 22 with a second optical layer 24 having indices of refraction which differ from both the in-plane indices of the biaxially-oriented layer. The mirror operates by reflecting light having either polarization because of the index of refraction mismatch between the two optical layers 22, 24. Mirrors may also be made using a combination of uniaxially-oriented layers with in-plane indices of refraction which differ significantly. In another embodiment, the first optical layers 22 are not birefringent and a mirror is formed by combining first and second optical layers 22, 24 which have significantly different indices of refraction. Reflection occurs without orientation of the layers. There are other methods and combinations of layers that are known for producing both mirrors and polarizers and which may be used. Those particular combinations discussed above are merely exemplary.

The second optical layers 24 may be prepared with a variety of optical properties depending, at least in part, on the desired operation of the multilayer optical film 20. In one embodiment, the second optical layers 24 are made of a polymer material that does not appreciably optically orient when stretched under conditions which are used to orient the first optical layers 22. Such layers are particularly useful in the formation of reflective polarizing films, because they allow the formation of a stack 26 of layers by, for example, coextrusion, which can then be stretched to orient the first optical layers 22 while the second optical layers 24 remain relatively isotropic. Typically, the index of refraction of the second optical layers 24 is approximately equal to one of the indices of the oriented first optical layers 22 to allow transmission of light with a polarization in a plane parallel to the direction of the matched indices. Preferably, the two approximately equal indices of refraction differ by about 0.05 or less, and more preferably by about 0.02 or less, at 632.8 nm. In one embodiment, the index of refraction of the second optical layers 24 is approximately equal to the index of refraction of the first optical layers 22 prior to stretching.

In other embodiments, the second optical layers 24 are orientable. In some cases, the second optical layers 24 have one in-plane index of refraction that is substantially the same as the corresponding index of refraction of the first optical layers 22 after orientation of the two sets of layers 22, 24, while the other in-plane index of refraction is substantially different than that of the first optical layers 22. In other cases, particularly for mirror applications, both in-plane indices of refraction of the optical layers 22, 24 are substantially different after orientation.

A brief description of one method for forming multilayer polymer films is described. A fuller description of the process conditions and considerations is found in U.S. patent application Ser. No. 09/006,288, incorporated herein by reference. The multilayer polymer films are formed by extrusion of polymers to be used in the first and second optical layers, as well as the non-optical layers. Extrusion conditions are chosen to adequately feed, melt, mix and pump the polymer resin feed streams in a continuous and stable manner. Final melt stream temperatures are chosen to be within a range which reduces freezing, crystallization or unduly high pressure drops at the low end of the range and which reduces degradation at the high end of the range. The entire melt stream processing of more than one polymer, up to and including film casting on a chill roll, is often referred to as co-extrusion.

Following extrusion, each melt stream is conveyed through a neck tube into a gear pump used to regulate the continuous and uniform rate of polymer flow. A static mixing unit may be placed at the end of the neck tube to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow is often controlled by choices made in machinery, as well as the shape and physical dimensions of the individual side channel tubes and layer slots.

The side channel tubes and layer slots of the two or more melt streams are often interleaved to, for example, form alternating layers. The feedblock's downstream-side manifold is often shaped to compress and uniformly spread the layers of the combined multilayer stack transversely. Thick, non-optical layers, known as protective boundary layers (PBLs), may be fed near the manifold walls using the melt streams of the optical multilayer stack, or by a separate melt stream. As described above, these non-optical layers may be used to protect the thinner optical layers from the effects of wall stress and possible resulting flow instabilities.

The multilayer stack exiting the feedblock manifold may then enter a final shaping unit such as a die. Alternatively, the stream may be split, preferably normal to the layers in the stack, to form two or more multilayer streams that may be recombined by stacking. The stream may also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers may form internal boundary layers between optical layers, while others form skin layers.

After multiplication, the web is directed to the final shaping unit. The web is then cast onto a chill roll, sometimes also referred to as a casting wheel or casting drum. This casting is often assisted by electrostatic pinning, the details of which are well-known in the art of polymer film manufacture. The web may be cast to a uniform thickness across the web or a deliberate profiling of the web thickness may be induced using die lip controls.

The multilayer web is then drawn to produce the final multilayer optical film. In one exemplary method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this exemplary method, a film is drawn in one in-plane direction. The second in-plane dimension is either held constant as in a conventional tenter, or is allowed to neck in to a smaller width as in a length orienter. Such necking in may be substantial and increase with draw ratio.

In one exemplary method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner.

The following examples demonstrate the manufacture and uses of the invention. It is to be understood that these examples are merely illustrative and are in no way to be interpreted as limiting the scope of the invention.

EXAMPLES

Comparative Example

Formation of an Optical Polarizer with a Polyvinyl Alcohol Dichroic Polarizing Film.

A solution containing 10 wt. % Airvol 107 polyvinyl alcohol (Air Products, Allentown, Pa.) and 0.1 wt. % Triton X-100 (Union Carbide, Danbury, Conn.) was coated onto a corona treated unoriented polyester cast web having four stacks of 209 optical layers, each utilizing a shoe coater which delivered a wet coating thickness of 64 $\mu$m (2.50 mils) of the solution. The coating was dried at 105° C. for 1 minute. The multilayer polyester cast web and the polyvinyl alcohol film were oriented simultaneously at 156° C. in a tenter oven in the direction transverse to the direction of extrusion of the reflective polarizer. The reflective polarizer and polyvinyl alcohol film were stretched to 6 times their original width.

The polyvinyl alcohol film was stained in an aqueous iodine/potassium iodide solution at 35° C. for 20 sec. The staining solution contained 0.4 wt. % iodine and 21 wt. % potassium iodide. The stain was fixed in a bath of boric acid/borax at 65° C. for 25 sec. The fixing solution contained 4.5 wt. % borax and 14.5 wt. % boric acid.

The optical polarizer transmitted 83.5% of light having the desired polarization and had a Q value of 17. The parameter Q is sometimes referred to as the dichroic ratio. This ratio, Q, is expressed in terms of the power transmissions of the high transmission polarization state and the extinction polarization state as follows:

$$Q=ln(T_{ext})/ln(T_{trans})$$

Where $T_{trans}$ is the transmission of the high transmission state and $T_{ext}$ is the transmission of the extinction state.

The polyvinyl alcohol film showed severe cracking and failed in a cross hatched tape pull adhesion test. The crosshatched tape pull adhesion test was performed as follows. First, a sample was placed on a clean, hard surface. Then, using a plastic template with a 1/8" slot spaced every 1/4", the sample was scribed with a scribing tool to produce a crosshatched pattern. The scribe went through the coating to the substrate without going through the substrate. A 4" strip of 1" wide Scotch® Brand #610 (3M Co., St. Paul, Minn.) tape was placed on the diagonal to the crosshatched pattern. Using the template, the tape was pressed down firmly to the sample. Next, using one swift movement, the tape was stripped off the sample at a low angle to the sample surface and in a direction away from the operator's body. The sample was examined for coating removal. If no coating has been removed, the sample passes the test. If any coating has been removed from the sample, the sample failed the test. In this particular case, the sample failed the test.

Example 1

Formation of an Optical Polarizer with a Polyvinyl Alcohol Dichroic Polarizing Film Containing a Sulfonated Polyester.

An aqueous dispersion containing 9 wt. % Airvol 107 polyvinyl alcohol (Air Products, Allentown, Pa.), 1 wt. % WB54 (a sulfonated polyester from 3M Co., St. Paul, Minn.), 3 wt. % N-methylpyrrolidone (available from Aldrich, Milwaukee, Wis.) and 0.1 wt. % Triton X100 (Union Carbide, Danbury, Conn.) was coated onto a corona treated unoriented multilayer polyester cast web, having four stacks of 209 optical layers each, using a shoe coater which delivered a wet coating thickness of 64 μm (2.50 mils) of the polyvinyl alcohol dispersion. The coating was dried at 105° C. for 1 minute. The polyvinyl alcohol coating and the multilayer cast web were preheated in a tenter oven zone heated with hot air charged to 160° C. and then drawn to six times their original width over 35 seconds in a tenter zone heated with hot air charged at 150° C. The films were then heated an additional 85 seconds prior to cooling. The construction exhibited only a low level of isolated, non-specific defects, possibly due to impurities or air bubbles.

The polyvinyl alcohol film was stained using an aqueous iodine/potassium iodide solution at 35° C. for 20 sec. The staining solution contained 0.4 wt. % iodine and 21 wt. % potassium iodide. The stain was fixed in a bath of boric acid/borax at 65° C. for 25 sec. The fixing solution contained 4.5 wt. % borax and 14.5 wt. % boric acid.

The optical polarizer transmitted 87.0% of light having the desired polarization and had a dichroic ratio, Q, of 17. The substrate passed the crosshatched tape pull adhesion test.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of making a polarizing film, the method comprising:

forming a polymeric film on a substrate, the polymeric film comprising polyvinyl alcohol and a water-soluble or water-dispersible second polymer in a ratio of polyvinyl alcohol:second polymer in the range of 5:1 to 100:1 by weight;

orienting the polymeric film while disposed on the substrate;

incorporating dichroic dye material into the polymeric film; and removing the polymeric film from the substrate.

2. The method of claim 1, wherein incorporating dichroic dye material into the polymeric film occurs prior to removing the polymeric film from the substrate.

3. The method of claim 1, wherein incorporating dichroic dye material into the polymeric film occurs after orienting the polymeric film.

4. The method of claim 1, wherein incorporating dichroic dye material into the polymeric film occurs before orienting the polymeric film.

5. The method of claim 1, further comprising disposing the polymeric film on a second substrate after removing the polymeric film from the substrate.

6. The method of claim 5, wherein disposing the polymeric film on a second substrate comprises adhering the polymeric film to the second substrate.

7. The method of claim 5, wherein the substrate comprises a reflective polarizer.

8. The method of claim 5, wherein the substrate comprises a mirror.

9. The method of claim 1, wherein orienting the polymeric film comprises stretching the polymeric film in at least one direction.

10. The method of claim 9, wherein orienting the polymeric film comprises stretching the polymeric film and the substrate in at least one direction.

11. A method of making a display device, the method comprising:

forming a polymeric film on a substrate, the polymeric film comprising polyvinyl alcohol and a water-soluble or water-dispersible second polymer in a ratio of polyvinyl alcohol: second polymer in the range of 5:1 to 100:1 by weight;

orienting the polymeric film while on the substrate;

incorporating dichroic dye material into the polymeric film to form a polarizing film;

removing the polymeric film from the substrate; and positioning the polarizing film in the display device.

12. The method of claim 11, further comprising disposing the polymeric film on a second substrate after removing the polymeric film from the substrate.

13. The method of claim 12, wherein disposing the polymeric film on a second substrate comprises adhering the polymeric film to the second substrate.

14. The method of claim 12, wherein the substrate comprises a reflective polarizer.

15. The method of claim 12, wherein the substrate comprises a mirror.

16. A method of making an optical device, the method comprising:

forming a polymeric film on a substrate, the polymeric film comprising polyvinyl alcohol and a water-soluble or water-dispersible second polymer in a ratio of polyvinyl alcohol:second polymer in the range of 5:1 to 100:1 by weight;

orienting the polymeric film while on the substrate;

incorporating dichroic dye material into the polymeric film to form a polarizing film;

removing the polymeric film from the substrate; and positioning the polarizing film in the optical device.

17. The method of claim 16, further comprising disposing the polymeric film on a second substrate after removing the polymeric film from the substrate.

18. The method of claim 17, wherein disposing the polymeric film on a second substrate comprises adhering the polymeric film to the second substrate.

19. The method of claim 17, wherein the substrate comprises a reflective polarizer.

20. The method of claim 17, wherein the substrate comprises a mirror.

21. The method of claim 1, wherein the second polymer is selected from the group consisting of polyvinyl pyrrolidone and polyesters.

22. The method of claim 11, wherein the second polymer is selected from the group consisting of polyvinyl pyrrolidone and polyesters.

23. The method of claim 16, wherein the second polymer is selected from the group consisting of polyvinyl pyrrolidone and polyesters.

* * * * *

UNITED STATES PATENT AND TRADEMARK OFFICE
CERTIFICATE OF CORRECTION

PATENT NO. : 6,610,356 B2
DATED : August 26, 2003
INVENTOR(S) : Kausch, William L.

It is certified that error appears in the above-identified patent and that said Letters Patent is hereby corrected as shown below:

Column 3,
Line 31, delete "mirrors.," and insert in place thereof -- mirrors. --.
Line 35, delete "diebroic" and insert in place thereof -- dichroic --.

Column 4,
Line 7, delete "describe" and insert in place thereof -- described --.

Column 5,
Line 3, delete "boroncontaining" and insert in place thereof -- boron-containing --.
Line 22, delete "aids" and insert in place thereof -- aid --.

Column 9,
Line 18, delete "tereplithalic" and insert in place thereof -- terephthalic --.

Column 10,
Line 15, delete "$n_x$and $n_y$are" and insert in place thereof -- $n_x$ and $n_y$ are --.

Column 12,
Line 15, delete "$d_1$, $d_2$ the" and insert in place thereof -- $d_1$, $d_2$ are the --.

Column 15,
Line 24, delete "Scotch⃞" and insert in place thereof -- Scotch$^{TM}$ --.

Signed and Sealed this

Thirteenth Day of January, 2004

JON W. DUDAS
*Acting Director of the United States Patent and Trademark Office*